United States Patent [19]

Stidham

[11] 3,997,730
[45] Dec. 14, 1976

[54] TIME DIVISION CONFERENCE CIRCUIT

[75] Inventor: James Richard Stidham, Broomfield, Colo.

[73] Assignee: Bell Telephone Laboratories, Incorporated, Murray Hill, N.J.

[22] Filed: Aug. 29, 1975

[21] Appl. No.: 609,038

[52] U.S. Cl. .......................................... 179/18 BC
[51] Int. Cl.² ......................................... H04M 3/56
[58] Field of Search ............................... 179/18 BC

[56] References Cited
UNITED STATES PATENTS

| | | | |
|---|---|---|---|
| 3,692,947 | 9/1972 | Lewis | 179/18 BC |
| 3,769,461 | 10/1973 | Lewis | 179/15 AT |
| 3,787,630 | 1/1974 | Carbrey | 179/15 AT |
| 3,796,833 | 3/1974 | Lewis et al. | 179/15 AT |
| 3,804,989 | 4/1974 | Carbrey | 179/15 AT |
| 3,828,146 | 8/1974 | Lewis | 179/170 NC |
| 3,903,372 | 9/1975 | Aro | 179/18 BC |

*Primary Examiner*—Thomas W. Brown
*Attorney, Agent, or Firm*—Frederick W. Padden; Paul E. Kudirka

[57] ABSTRACT

A conference circuit is disclosed for use in a time division switching system which has an incoming and an outgoing time division bus connected by a summing amplifier. During a conference call, a different group of conferee stations is connected to the incoming and outgoing buses by the switching system controller in each of a plurality of time slots dedicated to that call. Output signals from the connected stations are then applied to the incoming bus. The conference circuit is connected to the incoming and outgoing buses and includes storage and transfer circuitry. In each conference time slot, the storage circuitry stores the output signals generated by conferee stations connected during that time slot. Signals from conferee stations which were stored by the storage circuitry during previous time slot are combined by a combining means and the resulting sum is placed on the incoming bus. All signals on the incoming bus are then summed by the summing amplifier and the composite distributed to the conferee stations via the outgoing bus. The storage circuitry has further apparatus which develops a signal for storage equal to the output signal generated by the connected conferee stations by subtracting from the composite signal on the outgoing bus the contributions due to signals stored in previous time slots.

12 Claims, 1 Drawing Figure

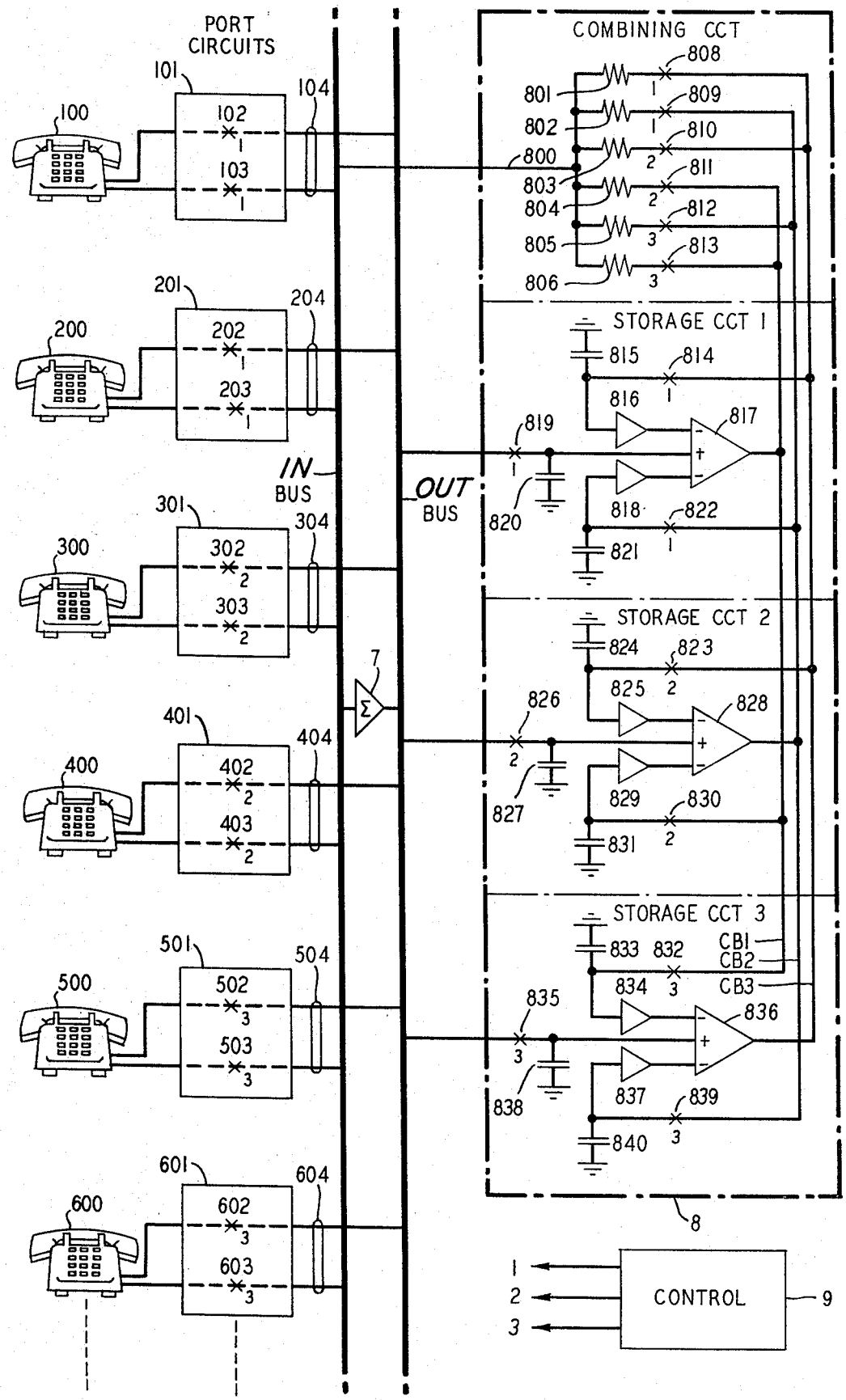

TIME DIVISION CONFERENCE CIRCUIT

BACKGROUND OF THE INVENTION

This invention relates to time division switching systems and in particular to circuits for providing conference call service in time division switching systems.

Many electronic switching systems utilize a switching technique which is known as time division switching. In this technique, communicating stations are connected to a common bus for short time intervals called time slots in order that the stations may exchange information. Typically, such systems have an incoming time division bus which receives output signals from the connected stations and an outgoing time division bus from which connected stations receive input signals. The two time division buses are connected by a summing amplifier circuit so that signals placed on the incoming bus are summed together and appear on the outgoing bus. Each station which is connected to the bus places its outgoing signal on the incoming bus, which signal is added to that of the other connected stations. Each station then receives the sum of its own and the other station signals from the outgoing bus. The stations contain a subtraction circuit which removes the signal contribution due to their own signals from the incoming sum signal. Therefore the station receives only the signals generated by the other connected station. At the end of a time slot, the stations are disconnected and another group of stations is connected and the process is repeated. In this way, many stations may be sequentially connected together to perform a communications switching function. The time slots occur in repetitive cycles so that at the end of a system cycle, the connections are repeated in sequential fashion.

Many of the switching systems available today contain a conferencing call feature. This feature allows three or more stations to be simultaneously connected together so that each may converse with the others. Many prior art circuits which perform the conferencing function simply connect each station in the conference call to the time division buses in a single time slot which is dedicated to the conference call. Each station then receives from the outgoing bus a composite signal which is the sum of all signals generated by all of the stations in the conference call. The station subtracts its own signal from the composite sum and receives the signals generated by the other stations. It has been found, however, that such conferencing circuits generate excessive transmission imbalance. The imbalance results when many stations are connected to the time division buses simultaneously and the summing bus amplifier becomes overloaded. The overloaded amplifier produces output signals on the outgoing bus which are of reduced magnitude; thus when each station subtracts its own signal from the reduced amplifier output, its own signal contribution is undesirably overcompensated.

Other circuits have been devised which utilize a transfer arrangement implemented by constant current sources which are connected to a storing circuit for a time proportional to the magnitude of the signal generated by the connecting stations. The composite sum which is stored is then sent to each station. Such circuits typically involve extensive and complicated circuitry to provide the conferencing function.

It is apparent therefore that there is a need for a conferencing circuit which minimizes transmission imbalance without requiring extensive and complex circuitry.

Accordingly, it is an object of the present invention to provide a conferencing circuit which reduces problems caused by overload of a summing bus amplifier.

It is a further object of the present invention to simplify the circuitry necessary for conferencing circuits.

SUMMARY OF THE INVENTION

The foregoing and other objects are achieved in accordance with principles of the present invention in one illustrative embodiment thereof wherein a conference circuit is connected to a time division switching system that has a plurality of time slots which occur in repetitive cycles, an incoming and an outgoing time division bus, and a plurality of conferee stations. The stations can be connected in groups (illustratively station pairs) to the time division buses to send information thereto and receive information therefrom in time slots dedicated to the conference call. The conference circuit is connected to the incoming and outgoing buses and comprises storage circuitry which is operative during each conference time slot. The storage circuitry utilizes signals generated by conferee stations connected to the outgoing time division bus to generate a conference communication signal equal to the output signal produced by the connected stations. This signal is stored for later distribution to other stations. Also, during each time slot a combining means is operative to sum conference communication signals stored by the storage circuitry during previous time slots. The sum signal is then applied to the incoming time division bus so that the connected station group may receive information from other station groups.

In particular, my illustrative storage circuitry comprises means for sampling the signals on the outgoing bus and means for sampling conference communication signals stored in previous time slots. The signals stored in previous time slots are subtracted by a subtraction amplifier from the signals on the outgoing bus to generate a conference communication signal which is then stored for use in subsequent time slots.

According to one aspect of my illustrative embodiment the sampling means comprise sample and hold capacitors which operate in cooperation with time division switches temporarily to store conferee signals. The stored signals are then applied to other storage circuits and to the combining means over conference buses.

It is a feature of my illustrative embodiment that the storage circuitry includes a plurality of storage circuits, one of which is associated with each conference time slot.

It is a further feature of the illustrative embodiment that each storage circuit comprises a plurality of sample and hold circuits, a subtraction amplifier and a conference bus which is driven by the output of the subtraction amplifier. A sample and hold circuit is provided which samples the signals on the outgoing bus. The sampled signals are applied to the positive input of the subtraction amplifier. A plurality of sample and hold circuits stores conference communication signals from other conference buses which are not connected to the storage circuit and these stored signals are applied to the negative inputs of the subtraction amplifier. The resulting conference communication signal, which is equal to the signals on the outgoing bus minus the sum of the signals on the other conference buses, is applied to the conference bus connected to the output of the subtraction amplifier.

Another aspect of my illustrative embodiment is that the combining means comprises a summing point, which includes a plurality of resistors connected to the incoming time division bus, and a plurality of time division switches which are operable to connect selected ones of the conference buses to the summing point.

BRIEF DESCRIPTION OF THE DRAWING

A single FIGURE of the drawing shows a schematic diagram of an illustrative embodiment of the conference circuit connected in a time division switching system.

DETAILED DESCRIPTION

The FIGURE shows a well-known design of time division switching system in which a plurality of telephone communication systems (of which only stations 100 through 600 are shown in the illustrative embodiment) are connected to incoming time division bus IN and outgoing time division bus OUT. Buses IN and OUT are connected together by summing amplifier 7. Thus, all signals appearing on bus IN are summed together and placed on bus OUT by amplifier 7. Each station, such as station 100, is selectively connectable to buses IN and OUT by means of a port circuit, such as port circuit 101, and leads 104. Port circuit 101 is in turn controlled by control circuit 9 which coordinates the operation and synchronizes a connection of all stations in the switching system.

Port circuit 101 contains various circuitry (not shown) which allows it to connect station 100 in the proper time slots to buses IN and OUT. Such circuitry is described in detail in U.S. Pat. No. 3,789,152 issued to D. G. Medill et al. on Jan. 29, 1974. In particular, port circuit 101 contains two time division switches which are schematically shown by normally open contacts 102 and 103. These switches are under control of circuitry (not shown) in port circuit 101 which is in turn controlled by control circuit 9. When the switches are closed, station 100 is coupled to buses IN and OUT by leads 104. When the switches are open, station 100 is uncoupled from buses IN and OUT. The time division switches and the circuits which control the operation of switches form no part of my invention and accordingly are not shown or described in detail. The operation and construction of switches 102 and 103 and associated control circuitry are well known. Switches which might illustratively be used with my conference circuit are shown in detail in copending application Ser. No. 536,852 filed Dec. 27, 1974 by D. G. Hill, now U.S. Pat. No. 3,973,142.

For purposes of explanation, time division switches 102 and 103 are operated in a time slot numbered one. This operation is indicated by a numeral shown below each switch. Similar numerals near other time division switches (schematically shown as normally open contacts) indicate closure in other time slots. In actual operation, switches 102 and 103 may be operated in any time slot under control of control circuit 9. However, for convenience, the time slot during which the switches are operated will be referred to as time slot 1. Thus, during time slot 1, switches 102 and 103 are closed and subscriber station 100 is connected via leads 104 to buses IN and OUT.

During the normal operation of the switching system, stations are illustratively connected in pairs during one time slot to buses IN and OUT so that communications information may be exchanged therebetween. Thus, for example, stations 100 and 200 may be connected to buses IN and OUT during time slot 1 to exchange information. Station 100 places outgoing signals via closed time division switch 103 and leads 104 on incoming bus IN. Station 200 places its outgoing signal via closed time division switch 203 and leads 204 on bus IN. Both output signals are summed by summing amplifier 7 and appear on bus OUT. The composite signal is returned to stations 100 and 200 by leads 104 and closed switch 102 and leads 204 and closed switch 202, respectively. Port circuits 101 and 201 contain circuitry (not shown) which subtracts the station's own output signal from the incoming composite signal leaving the signal generated by the other station as the incoming signal. The subtraction circuitry is well known and is described in detail, for example, in U.S. Pat. No. 3,828,146 issued to T. G. Lewis on Aug. 6, 1974. Thus, each station provides an output signal to the other station and receives an output signal from the other station. At the end of time slot 1, stations 100 and 200 are disconnected and another pair of stations, for example, stations 300 and 400 may be connected together under control of control circuit 9. At the end of a full cycle of time slots, stations 100 and 200 are again connected together and may then exchange information in a sequential cyclic pattern.

Advantageously, the time division switching system shown in the drawing has my illustrative conferencing circuit shown in the heavy line box 8 connected thereto. This conferencing circuit allows several subscriber stations to be connected in a conference call so that each station may send information with all others and receive information from all others. Conferencing circuit 8 consists of three buses, CB1 – CB3, on which signals are controlled by storage circuits 1–3 including subtraction amplifier circuits 817, 828 and 836, respectively. The buses and amplifiers act as storage circuits for output signals developed by stations as will hereinafter be described. Each conference bus receives signals from bus OUT by means of a time division switch and storage capacitor. For example, conference bus CB1 is connected to bus OUT by time division switch 819. Buses CB1–CB3 are also advantageously interconnected so that the incoming signal from bus OUT is adjusted to remove signals from nonconnected stations as will hereinafter be described. For example, conference bus CB1 and amplifer 817 is connected to buses CB2 and CB3 by means of time division switches 814, amplifier 816 and time division switch 822 and amplifer 818, respectively. In addition, buses CB1 through CB3 are connected to time division bus IN by a combining means including time division switches 808–813, resistors 801–806 and summing point 800. This connection allows signals on conference buses CB1–CB3 to be selectively connected to bus IN to provide stored signal outputs from station pairs in time slots when the pairs are not connected to the time division bus.

Assume now for the purposes of illustration that a conference call involving stations 100 through 600 is to be placed in the system. The number of stations involved in a conference call may actually vary from three up to many stations. However, for clarity of description, six stations have been chosen for an illustrative conference call. Control 9 is arranged in a well-known manner to connect the stations involved in the conference call in pairs to the time division buses IN and OUT during each conference time slot. Depending on the characteristics of summing amplifier 7, stations may be connected in larger or smaller subgroups than two to the time division buses without causing severe overloading of the amplifier. For purposes of illustration, however, two stations are shown connected during each time slot.

During the first time slot (designated time slot 1), stations 100 and 200 are connected via port circuits 101 and 201 to buses IN and OUT. Since six stations are to be connected in pairs to the time division buses, three time slots are required. In the illustrative embodiment, these time slots are numbered 1 through 3; however, this numbering is merely for convenience of expanation. The time slots need not be sequential and need not appear in the order shown in e illustrative example in order for the conferencing feature to operate.

In time slot 1, output signals from stations 100 and 200 are placed on time division bus IN via closed time division switches 103 and 203. However, in addition, signals on conference buses CB2 and CB3 are gated, via the combining means including time division switches 808 and 809, resistors 801 and 802 and summing point 800 onto time division bus IN. As will be hereinafter explained, each conferencing bus and associated storage circuit stores the output signals from stations connected to bus OUT during its associated time slot. Thus conference buses CB2 and CB3 contain output signals from stations 300, 400, 500 and 600, which signals were stored by storage circuits 2 and 3 in previous time slots. All the output signals present on time division bus IN are added by summing amplifier 7 and the composite signal appears on time division bus OUT. These signals are received by port circuits 101 and 201 by means of closed time division switches 102 and 202. As previously described, port circuits 101 and 201 contain subtraction circuitry which removes the station's own signal from the incoming composite signal. Thus, each of stations 100 and 200 receives an output signal from the other connected station plus output signals from other station groups stored on conference buses CB2 and CB3. Information is thereby exchanged among all stations in the conference call.

In addition to being distributed to stations 100 and 200, the composite signal appearing on bus OUT is used to generate a conference communication signal equal to the output signals produced by stations 100 and 200. This signal is then stored on conference bus CB1 for use in subsequent time slots. In particular, the composite signal appearing on time division bus OUT is gated onto sampling capacitor 820 by time division switch 819 which is closed during time slot 1. The signal on capacitor 820 is applied to the positive input of amplifier 817. A signal on conference bus CB3 is applied via closed time division switch 814 to sampling capacitor 815 and the stored signal is then applied via amplifier 816 to one negative input of amplifier 817. Similarly, the signal stored on conference bus CB2 is applied to sampling capacitor 821 via time division switch 822. The stored signal is thereupon applied to the other negative input of amplifier 817 by means of amplifier 818. Thus, the output of amplifier 817 is equal to the difference between the composite signal on time division bus OUT and the sum of the signals on conference buses CB2 and CB3. As previously explained, the composite signal on time division bus OUT is equal to the output signals generated by stations 100 and 200 during time slot 1 plus stored signals on conference buses CB2 and CB3 which signals were gated onto time division bus IN by means of time division switches 808 and 809 and summing point 800. Thus, when the signals on conference buses CB2 and CB3 are subtracted from the composite signal on time division bus OUT by amplifier 817, the resulting difference (the conference communication signal) is equal to the output signals generated by stations 100 and 200 during time slot 1. This signal is placed on conference bus CB1 to be used in later time slots. The signal is held on the conference bus by means of capacitors 815, 820 and 821 and amplifiers 816, 818 and 817.

At the end of time slot 1, stations 100 and 200 are disconnected from time division buses IN and OUT and the next group of stations consisting of stations 300 and 400 is connected to time division buses IN and OUT by means of time division switches 302, 303 and 402, 403, respectively, which switches are closed during time slot 2. Operation of conference circuit 8 is analogous to the operation involving stations 100 and 200. Storage circuits 2 and 3 contain circuitry similar to storage circuit 1 and therefore the operation will not be discussed in detail. Output signals from stations 300 and 400 appear on time division bus IN via closed time division switches 303 and 403. In addition, signals on conference buses CB1 and CB3 are connected to time division bus IN via time division switches 810 and 811, resistors 803 and 804 and lead 800. As previously described, conference bus CB1 contains the output signals generated by stations 100 and 200 during preceding time slot 1. Likewise, conference bus 3 contains output signals generated by stations 500 and 600 in a preceding time slot. These signals are added to the output signals generated by stations 300 and 400 by summing amplifier 7, and the resulting composite signal is applied to time division bus OUT and is distributed to stations 300 and 400 via time division switches 302 and 402. Each station subtracts out its own signal leaving an incoming signal which consists of output signals generated by the other stations. In addition, the signal on conference bus CB2 is updated as previously described by means of amplifiers 825, 828, and 829, capacitors 824, 827 and 831, and time division switches 823, 826 and 830. Signals on conference buses CB1 and CB3 are subtracted from the composite signal on time division bus OUT and the difference signal (which is equivalent to the output signals generated by stations 300 and 400 during time slot 2) is applied to conference bus CB2. At the end of time slot 2, stations 300 and 400 are disconnected and the next pair of stations, consisting of stations 500 and 600, are connected to buses IN and OUT during time slot 3. Operation proceeds in a manner discussed above resulting in each station receiving the sum of the output signals generated by other stations and the output signals generated by stations 500 and 600 being stored on conference bus CB3.

The sequence of operations is, of course, repeated during each system cycle so that an information exchange may occur between stations. Since only two stations in the illustrative embodiment are connected to time division buses IN and OUT during any one time slot, the loading on amplifier 7 is reduced and accordingly the imbalance problem caused by improper subtractions in the port circuits is also reduced.

Although the illustrative embodiment shows only six stations in a conference call, it is entirely within the skill of the art to expand the circuit to include more than six stations. For each pair of stations which is added, an additional conference bus and associated amplifiers must be added to conference circuit 8. Other modifications within the skill of the art are also apparent.

What is claimed is:

1. A conference circuit for use in a time division switching system having a plurality of time slots occurring in repetitive cycles, an incoming and an outgoing time division bus, a plurality of conferee stations selectively connectable in groups to said incoming bus during distinct conference time slots of said plurality of time slots for transferring output signals to said incoming bus and being selectively connectable to said outgoing bus for receiving input signals from said outgoing bus, said circuit comprising:

a plurality of storage means, each of said storage means being operative during a different one of said conference time slots and being responsive to signals on said outgoing bus for storing a conference communication signal equal to the output signal produced by a station group connected to said outgoing bus during said one different conference time slot; and combining means operative during said one different conference time slot and responsive to conference communication signals stored by said storage means for summing conference communication signals stored by said storage means during other time slots and applying the resulting sum to said incoming time division bus.

2. A conference circuit according to claim 1 wherein each one of said plurality of storage means comprises:

means cooperating with other ones of said storage means for sampling conference communication stored by said other ones of said storage means, and means responsive to signals on said outgoing bus and cooperating with said sampling means for subtracting said sampled signals from said signals on said outgoing bus to generate a conference communication signal.

3. A conference circuit according to claim 2 wherein said combining means further comprises a summing point connected to said incoming bus and means for selectively connecting each of said storage means to said summing point.

4. A conference circuit for use in a time division communication system wherein a plurality of time slots occur in repetitive cycles, said system having a plurality of stations selectively connectable in groups during distinct conference time slots of said plurality of time slots to an incoming time division bus for transferring output signals to said incoming bus and selectively connectable in said groups to an outgoing time division bus in the distinct conference time slots for receiving signals from said outgoing bus, said system also having means for summing all signals appearing on said incoming bus and applying the sum to said outgoing bus, said circuit comprising:

a conference bus for each group of said plurality of stations;

first applying means responsive to signals on said outgoing bus and signals on said conference buses for applying to one of said conference buses in one of said conference time slots resultant signals equal to the difference between said signals on said outgoing bus and the sum of the signals on the others of said conference buses; and second applying means operative during said one conference time slot and responsive to signals on said conference buses for applying a signal equal to the sum of the signals on said other conference buses to said incoming bus.

5. A conference circuit according to claim 4 wherein said first applying means comprises:

first means for storing said signals on said outgoing bus;

second means for storing the signals on the others of said conference buses; and means for subtracting signals stored in said second storing means from signals stored in said first storing means.

6. A telecommunications switching system comprising:

an incoming and an outgoing bus;

a plurality of stations selectively connectable to said incoming and outgoing buses to transfer signals therebetween;

summing means for applying all signals on said incoming bus to said outgoing bus;

means for connecting small groups of said stations to said incoming and outgoing buses during each of a plurality of dedicated conference time slots; and a plurality of conference buses, each one of said buses associated with a different one of said conference time slots;

means operative during one of said conference time slots and connected to said outgoing bus for storing output signals generated by the station group connected during said one time slot on the associated one of said conference buses; and means operative during said one time slot and responsive to stored signals on conference buses associated with other conference time slots for summing said stored signals and delivering the resulting sum to said incoming bus.

7. A telecommunications switching system according to claim 6 wherein said storing means further comprises means responsive to stored signals on conference buses associated with said other conference time slots for summing said stored signals to form an intermediate sum, means for sampling and storing output signals on said outgoing bus during said one time slot and means responsive to stored output signals and said intermediate sum for forming the difference thereof.

8. A conference circuit for use in a time division switching system wherein a plurality of time slots occur in repetitive cycles, said system having a plurality of stations connectable in pairs in a conference call in sequential conference time slots of said plurality of time slots to an incoming time division bus for transferring output signals to said incoming bus and to an outgoing time division bus for receiving signals from said outgoing bus, said system also having means for summing all signals appearing on said incoming bus and applying the sum to said outgoing bus, said circuit comprising:

a plurality of conference buses, each associated with a different one of said plurality of conference time slots;

first means operative in one of said conference time slots for sampling and holding the signals on said outgoing bus;

second means operative in said one time slot for sampling and holding signals on conference buses associated with other time slots;

subtraction means responsive to signals held in said first and said second sampling and holding means for subtracting signals in said second sampling and holding means from signals in said first sampling and holding means and for applying the resulting difference as signals to the conference bus associated with said one time slot;

a summing point connected to said incoming bus; and selective connecting means operable during said one time slot for selectively connecting conference buses associated with other time slots to said summing point.

9. A conference circuit according to claim 8 wherein said switching system further includes a system controller for operating said switching system and said first sampling and holding means comprises a first sampling capacitor connectable to said outgoing bus and a time division switch operable by said controller to connect said first capacitor to said outgoing bus.

10. A conference circuit according to claim 9 wherein said second sampling and holding means comprises a plurality of second sampling capacitors, each of which is connectable to one of said conference buses and a plurality of time division switches each operable by said controller to connect each of said second capacitors to its respective conference bus.

11. A conference circuit according to claim 10 wherein said subtraction means comprises a subtraction amplifier having a positive input, negative inputs and an output connected to the conference bus associated with said one time slot;

first means for connecting said positive input to said first sampling and holding means; and second means for connecting said negative inputs to said second sampling and holding means.

12. A conference circuit according to claim 11 wherein said summing point comprises a plurality of resistors connected to said incoming bus and said selective connecting means comprises a plurality of time division switches, each operable by said controller to connect one of said conference buses to a different one of said plurality of resistors.

* * * * *